(12) United States Patent
Park et al.

(10) Patent No.: US 11,906,847 B2
(45) Date of Patent: Feb. 20, 2024

(54) OPTICAL FILM AND BACK LIGHT UNIT INCLUDING THE SAME

(71) Applicant: LMS Co., Ltd., Pyeongtaek-si (KR)

(72) Inventors: Hyeonuk Park, Pyeongtaek-si (KR); Byeonghun Lee, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 0 days.

(21) Appl. No.: 17/950,896

(22) Filed: Sep. 22, 2022

(65) Prior Publication Data

US 2023/0229040 A1 Jul. 20, 2023

(30) Foreign Application Priority Data

Sep. 23, 2021 (KR) .................. 10-2021-0125614

(51) Int. Cl.
*F21V 8/00* (2006.01)
*G02F 1/13357* (2006.01)

(52) U.S. Cl.
CPC ..... *G02F 1/133615* (2013.01); *G02B 6/0023* (2013.01); *G02B 6/0065* (2013.01); *G02B 6/0081* (2013.01); *G02F 1/133608* (2013.01); *G02F 2201/56* (2013.01)

(58) Field of Classification Search
CPC ......... G02F 1/133615; G02F 1/133608; G02F 2201/56; G02B 6/0023; G02B 6/0065; G02B 6/0081
See application file for complete search history.

(56) References Cited

U.S. PATENT DOCUMENTS

| | | | |
|---|---|---|---|
| 5,359,691 A * | 10/1994 | Tai .................. | G02F 1/13362 362/561 |
| 7,614,777 B2 * | 11/2009 | Koganezawa ....... | G02B 6/0068 362/613 |
| 2020/0110309 A1 | 4/2020 | Masuda | |
| 2020/0341335 A1 | 10/2020 | Tsai et al. | |
| 2021/0072598 A1 * | 3/2021 | Walker .............. | G02B 5/0278 |
| 2021/0397049 A1 | 12/2021 | Allen et al. | |
| 2022/0050324 A1 * | 2/2022 | Lien .................. | G02F 1/133611 |
| 2022/0334432 A1 * | 10/2022 | Xu .................... | G02F 1/133614 |

FOREIGN PATENT DOCUMENTS

| | | |
|---|---|---|
| JP | 2020-086432 A | 6/2020 |
| KR | 10-2009-0039556 A | 4/2009 |
| KR | 10-2012-0075059 A | 7/2012 |
| KR | 10-2016-0097153 A | 8/2016 |
| TW | 2020-36060 A | 10/2020 |

* cited by examiner

*Primary Examiner* — Donald L Raleigh
(74) *Attorney, Agent, or Firm* — NKL Law; Jae Youn Kim

(57) ABSTRACT

A backlight unit includes a light source, a color conversion sheet disposed above the light source for converting a color of light emitted from the light source, and at least one optical film is disposed over the color conversion sheet. The one optical film has a base film, a first pattern layer including first patterns on one surface of the base film, and a second pattern layer disposed on the other surface of the base film and including second patterns different from the first patterns.

17 Claims, 13 Drawing Sheets

|  | (a) | (b) |
|---|---|---|
| Thickness (μm) | 300 | 240 |
| HSV | 4.8 | 4.4 |
| Brightness | 126 | 120 |
| Viewing Angle Distribution — Prism Sheets Excluded |  |  |
| Viewing Angle Distribution — Prism Sheets Included |  |  |

OPTICAL FILM AND BACK LIGHT UNIT INCLUDING THE SAME

CROSS-REFERENCE TO RELATED APPLICATION(S)

This application is based on and claims priority under 35 U.S.C. 119 to Korean Patent Application No. 10-2021-0125614, filed on Sep. 23, 2021, in the Korean Intellectual Property Office, the disclosure of which is herein incorporated by reference in its entirety.

TECHNICAL FIELD

The present invention is generally related to an optical film and a backlight unit including the same.

BACKGROUND

In general, a Liquid Crystal Display (LCD) module includes a backlight unit that uniformly irradiates light to the entire screen of an electronic device. The backlight unit is of an edge type that requires a light guide plate located on the side of the substrate that converts linear light source the lamp into surface light source, and of a direct type that requires the lamp located directly below the substrate thereby no light guide plate is necessary. Between the two types, the direct type backlight unit is widely used in a recent Liquid Crystal Display module because it has a high light-use efficiency, a simple configuration, and has no limitation on the size of a substrate. A general direct type backlight unit may include a light source, a diffusion sheet and prism sheets condensing light. After the light emitted from the light source is diffused through the diffusion sheet, it may be transmitted to the liquid crystal panel through the prism sheets provided above.

As a light source, a Liquid Crystal Display module using a mini-LED (Light Emitting Diode) and/or a micro-LED which are advantages for miniaturization, weight reduction, and/or low power consumption is being actively used. Utilizing mini-LEDs or micro-LEDs as a light source for the LCD module can realize sharper image quality over a conventional light source without having restriction with respect to a size and shape of the display device because each chip of those LEDs can configure an individual pixel or a light source. Thus, research on a backlight unit improving the LED light characteristics is being actively conducted with the miniaturization of the size of the LED chip.

A direct type backlight unit utilizing a mini-LED or a micro-LED as a light source may use a diffusion sheet to convert light from a point light source into a surface light source. Because the direct type backlight unit arranges the light source on a plane substrate, a thick diffusion sheet or a plurality of stacked diffusion sheets may be used to prevent the shape of the light source (e.g., the shape of a mini-LED or micro-LED) from being visually recognized by the liquid crystal panel. Because the diffusion sheet must be thick to prevent the shape of the light source from being visually recognized by the liquid crystal panel, there is a limit to the thinning of the Liquid Crystal Display module and thus, the LCD module has a problem for brightness deterioration due to the diffusion sheet.

In the present invention, it provides an optical film for a backlight unit of the LCD module having an excellent performance preventing the shape of the light source from being visually recognized by the liquid crystal panel (so called "shielding performance") without using a thick diffusion sheet through various embodiments of the present invention.

Effects provided in the present invention are not limited to the above-mentioned effects, and other effects not mentioned may be clearly understood by those of ordinary skill in the art to which the present invention belongs from the description below.

SUMMARY

According to an embodiment of the invention, there is provided that a backlight unit that includes a light source, a color conversion sheet disposed above the light source for converting a color of light emitted from the light source, and an optical film disposed on the color conversion sheet further comprising a base film, a first pattern layer including a first pattern on one surface of the base film wherein the first pattern includes a plurality of prisms arranged parallelly in a first direction; and a second pattern layer including a second pattern different from the first pattern disposed on the other surface of the base film wherein the second pattern has a plurality of pyramids including a plurality of rows in a second direction and a plurality of columns in a third direction perpendicular to the second direction.

In an embodiment, the optical film for the backlight unit in the present invention includes the second direction formed to have an acute angle with the first direction.

In an embodiment, the acute angle of the optical film for the backlight unit in the present invention is in a range of 15° to 45°.

In an embodiment, the optical film for the backlight unit in the present invention includes the pyramids wherein the pyramids are designed to have a size gradually increasing in a P1 direction toward to the color conversion sheet, and the prisms are designed to have a size gradually decreasing in a P2 direction opposite to the direction P1.

In an embodiment, the backlight unit in the present invention also includes a first and a second prism sheet disposed on the at least one optical film, wherein the first prism sheet and the second prism sheet having a plurality of prisms are stacked together and a pattern of the first prism and the second prism are arranged in a different direction each other.

In an embodiment, the prism sheet for the backlight in the present invention wherein the first prism sheet and the second prism sheet are laminated.

In an embodiment, the backlight unit in the present invention further includes a second optical film disposed on the first optical film wherein the second optical film comprises a second base film; a third pattern layer formed to have a plurality of prisms on one surface of the second base film; and a fourth pattern layer disposed on the other surface of the second base film and having a fourth pattern different from the third pattern wherein the fourth pattern layer comprises a plurality of pyramids.

In an embodiment, a cross-section of the prism of the first pattern layer is a first triangular shape, and a cross-section of the pyramid of the second pattern layer is a second triangular shape in the optical film for the backlight unit in the present invention.

In an embodiment, the prism of the first pattern layer forms a first apex angle defined as an angle between two opposing sides among three sides of the first triangular shape, and the first apex angle is in a range of 70° to 150° in the optical film for the backlight unit in the present invention.

In an embodiment, the pyramid of the second pattern layer is forms a second apex angle defined as an angle between two opposing sides of the four sides of the pyramid shape, and the second apex angle is in a range of 70° to 150° in the optical film for the backlight unit in the present invention.

In an embodiment, the second pattern layer includes a plurality of line patterns formed in parallel with respect to one pyramid surface of the pyramid and each of the plurality of line patterns is in an interval of 10 µm or less in the optical film for the backlight unit in the present invention.

In an embodiment, the plurality of line patterns is formed in a pattern where 10 or less lines are arranged side by side on the one pyramid surface in the optical film for the backlight unit in the present invention.

In an embodiment, the second pattern layer further includes a barrier rib formed between the pyramids wherein the barrier rib has a planar section having a size of 30% or less with respect to a pitch of the pyramids in the optical film for the backlight unit in the present invention.

According to another embodiment of the invention, there is provided that a backlight unit includes a light source, an optical film comprising a first base film; a first pattern layer formed on one surface of the first base film; and a second pattern layer disposed on the other surface of the first base film and having a second pattern different from the first pattern; and a first prism sheet including a plurality of prisms arranged parallelly along in one direction; and a second prism sheet including a plurality of prisms arrange parallelly along in a direction different from the arrangement direction of the first prisms wherein the first prism sheet is disposed above the optical film and the second prism sheet is disposed on the first prism sheet.

In an embodiment, the optical film for the backlight unit in the present invention includes the first pattern layer including a plurality of prisms and the second pattern layer comprising a plurality of pyramids.

In an embodiment, the backlight unit in the present invention includes the first prism sheet and the second prism sheet being laminated.

BRIEF DESCRIPTION OF THE DRAWINGS

The components of the following figures are shown to emphasize the general principles of the present invention and are not necessarily drawn to scale, although at least one of the figures may be drawn to scale. Reference characters designating corresponding components are repeated as necessary throughout the figures for the sake of consistency and clarity.

DETAILED DESCRIPTION

Figure 1:
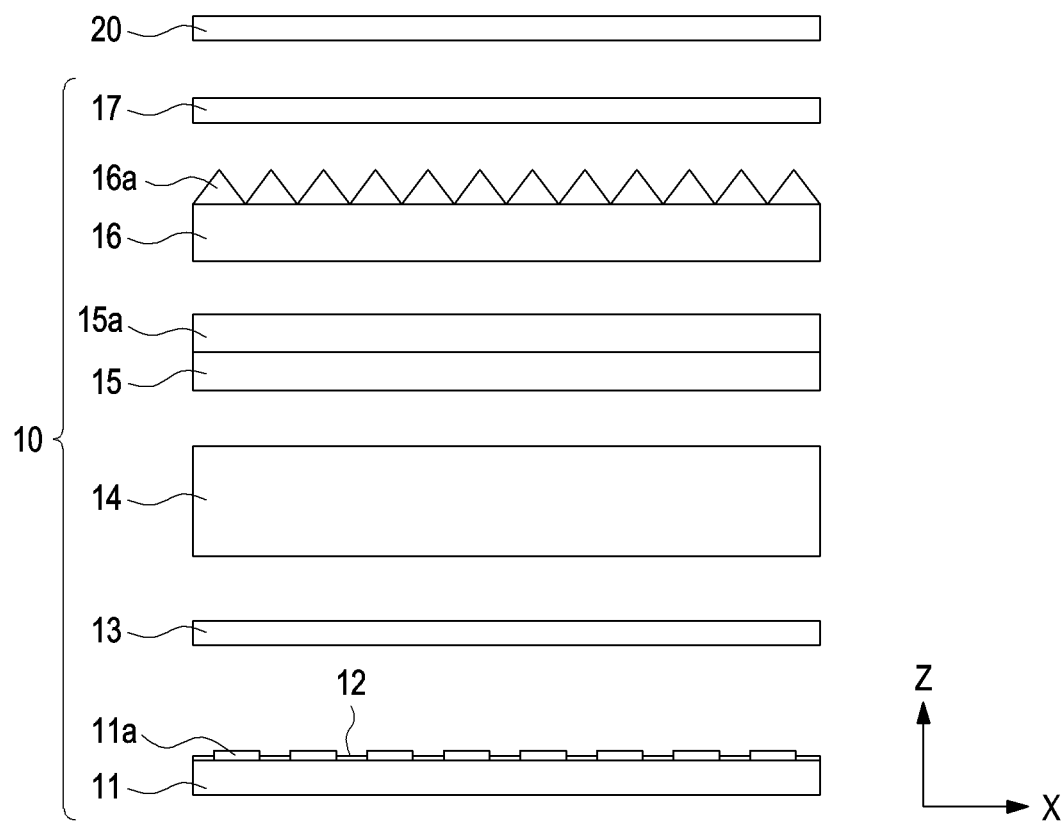
FIG. 1 is an overview showing a Liquid Crystal Display module including a diffusion sheet according to an embodiment in the present invention.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., a module or a program) of the above-described components may include a singular or a plurality of entities, and some of the plurality of entities may be separately disposed in other components. According to various embodiments, one or more components or operations among the above-described corresponding components may be omitted, or one or more other components or operations may be added. Alternatively, or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component are executed sequentially, in parallel, repeatedly, or heuristically, or one or more of the operations are executed in a different order or omitted, or one or more other operations may be added.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is an overview showing a Liquid Crystal Display module including a diffusion sheet according to an embodiment of the present invention.

In FIG. 1, a Liquid Crystal Display module includes a backlight unit 10 and a liquid crystal panel 20. According to various embodiments, the backlight unit 10 is disposed toward the rear surface (the side facing the −Z direction) of the liquid crystal panel 20 to emit light to the liquid crystal panel 20. The backlight unit 10 includes a substrate 11 including a light source 11a, a color conversion sheet 13, diffusion sheets 14 and 17, and prism sheets 15 and 16. Although not shown in the drawings, the backlight unit 10 can further include a reflective polarizing sheet.

According to various embodiments, the light source 11a is a configuration for emitting light to the rear surface of the liquid crystal panel 20 and is disposed on one surface of the substrate 11. The light source 11a can be a Light Emitting Diode (referred to as LED). The light source 11a includes, for example, a plurality of LED chips 11a for emitting light. Depending on the size of the LED chip, large LEDs (chip size: 1,000 μm or more), middle LEDs (chip size: 300-500 μm), and small LEDs (chip size: 200-300 μm), mini-LEDs (chip size 100-200 μm), and micro-LEDs (chip size: 100 μm or less) are available to configure the light source. Here, the LED includes material such as InGaN or GaN. Light emitted from the light source 11a is emitted toward the liquid crystal panel 20 (−Z direction). Light emitted from the light source 11a passes through the color conversion sheet 13 and be incident on the diffusion sheet 14.

According to various embodiments, the reflective sheet 12 can be formed on the surface of the substrate 11. The reflective sheet 12 can include material such as $BaSO_4$, $TiO_2$, $CaCO_3$, $SiO_2$, $Ca_3(SO_4)_2$ or may include material such as Ag. Ag can be deposited or coated between the light sources 11a and on the substrate 11. The reflective sheet 12 can also reflect light which was emitted from the light source 11a, transmitted through the color conversion sheet 13, the diffusion sheets 14 and 17, and the prism sheets 15 and 16, and then reflected back to the substrate 11 due to the interfacial reflection. It may serve to reflect the reflected light back into the emitted direction of the light. Through this process, loss of light can be minimized. As a result, the reflective sheet 12 can perform light recycling.

According to various embodiments, the color conversion sheet 13 converts the color of the light emitted from the light source 11a. For example, the light of the mini-LEDs or micro-LEDs can be blue light (450 nm). In this case, the blue light needs to be converted into white light. The color conversion sheet 13 transmits blue light emitted from the light source 11a while simultaneously converting blue light into white light.

According to various embodiments, the diffusion sheets 14 and 17 uniformly disperse light incident from the color conversion sheet 13. The diffusion sheets 14 and 17 include at least one of a curable resin (e.g., urethane acrylate, epoxy acrylate, ester acrylate, and radical generating monomer) to which light diffusing agent beads are added. It can be used alone or mixed) to cause light diffusion by the optical powder bead by depositing the solution. In addition, the diffusion sheets 14 and 17 can have a protrusion pattern (or protrusion) having a uniform or non-uniform size shape (e.g., a spherical shape) to promote light diffusion.

According to various embodiments, the diffusion sheets 14 and 17 may include a lower diffusion sheet 14 and an upper diffusion sheet 17. The lower diffusion sheet 14 is disposed between the color conversion sheet 13 and the prism sheet 15, and the upper diffusion sheet 17 is disposed between the prism sheet 16 and the liquid crystal panel 20. If the backlight unit 10 further includes a reflective polarizing sheet, the upper diffusion sheet 17 may be disposed between the prism sheet 16 and the reflective polarizing sheet.

According to various embodiments, the prism sheets 15 and 16 may condense incident light using an optical pattern formed on the surface, and then emit the light to the liquid crystal panel 20. The prism sheets 15 and 16 may include a light-transmitting base film and a prism pattern layer formed on an upper surface (a surface facing the +Z-axis direction) of the base film. The prism pattern layer may be formed as an optical pattern layer in the form of a triangular array in which an inclined surface of a specified angle (e.g., an inclined surface of 45°) is formed to improve luminance in the plane direction. The prism patterns of the prism pattern layer may have a triangular prism shape, and one surface of the triangular prism may be disposed to a face the base film.

According to an embodiment, the prism sheets 15 and 16 includes the first prism sheet 15 and the second prism sheet 16 to form a composite prism sheet structure. Here, the second prism sheet 16 may be disposed to overlap the upper surface of the first prism sheet 15. In the first prism sheet 15, a plurality of first prism patterns may be arranged side by side. Each of the first prism patterns may have a structure extending in one direction. For example, the vertex lines 15a of each of the first prism patterns may be formed to extend toward the X-axis direction. Similarly, in the second prism sheet 16, a plurality of second prism patterns may also be arranged in parallel with each other. Each of the second prism patterns may have a structure extending in one direction. For example, the vertex lines 16a of each of the second prism patterns may be formed to extend toward the Y-axis direction. Here, the extending direction of the first prism patterns and the extending direction of the second prism patterns are illustrated as being directed to the X-axis and the Y-axis for convenience of description. However, it is not limited to the illustrated embodiment, and may be directed in a direction other than the X-axis or the Y-axis.

According to various embodiments, a reflective polarizing sheet (not shown) is provided on the prism sheets 15 and 16 and the upper diffusion sheet 17 to collect light from the prism sheets 15 and 16 and diffused by the upper diffusion sheet 17. It can serve to transmit some polarized light and reflect other polarized light downward.

According to various embodiments, the liquid crystal panel 20 may refract the light emitted from the light source 11a in a predetermined pattern according to an electrical signal. The refracted light may pass through a color filter and a polarization filter disposed on the front surface of the liquid crystal panel 20 to form a screen.

Figure 2:
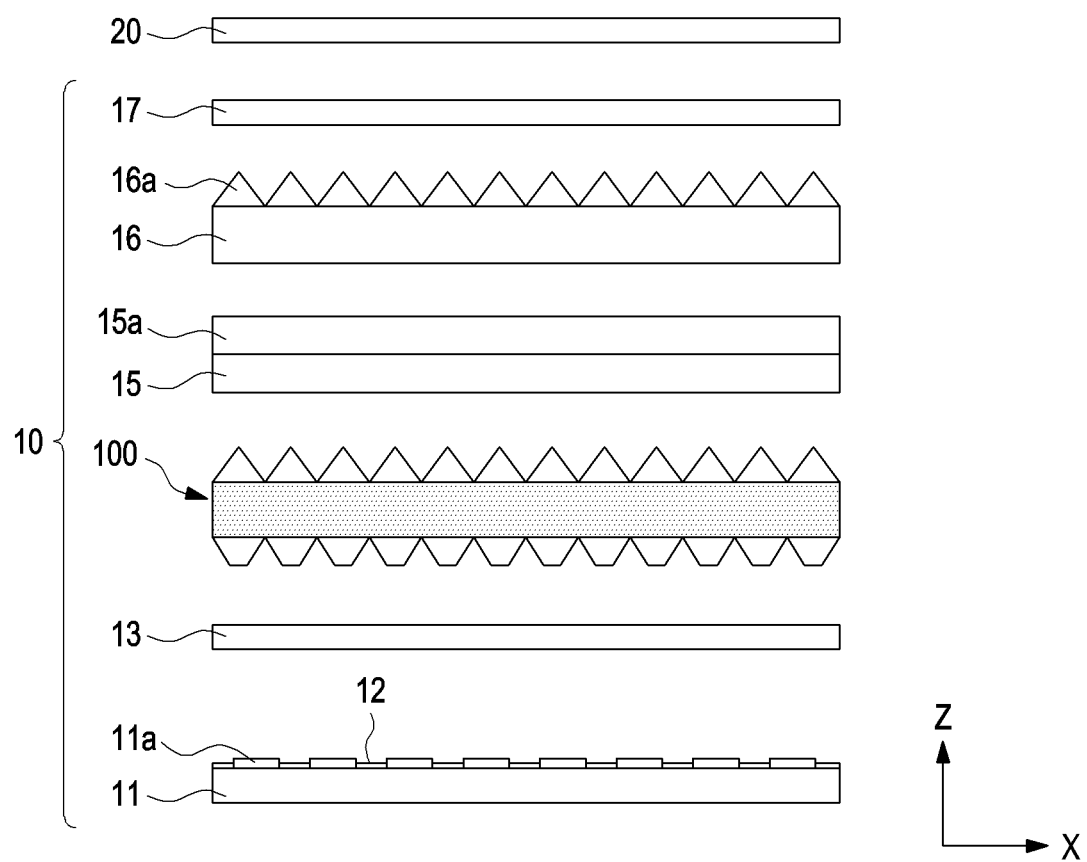
FIG. 2 is a side view illustrating a Liquid Crystal Display device including a backlight unit according to various embodiments in the present invention.

FIG. 2 is a side view illustrating a Liquid Crystal Display device including a backlight unit according to various embodiments in the present invention.

Figure 3:
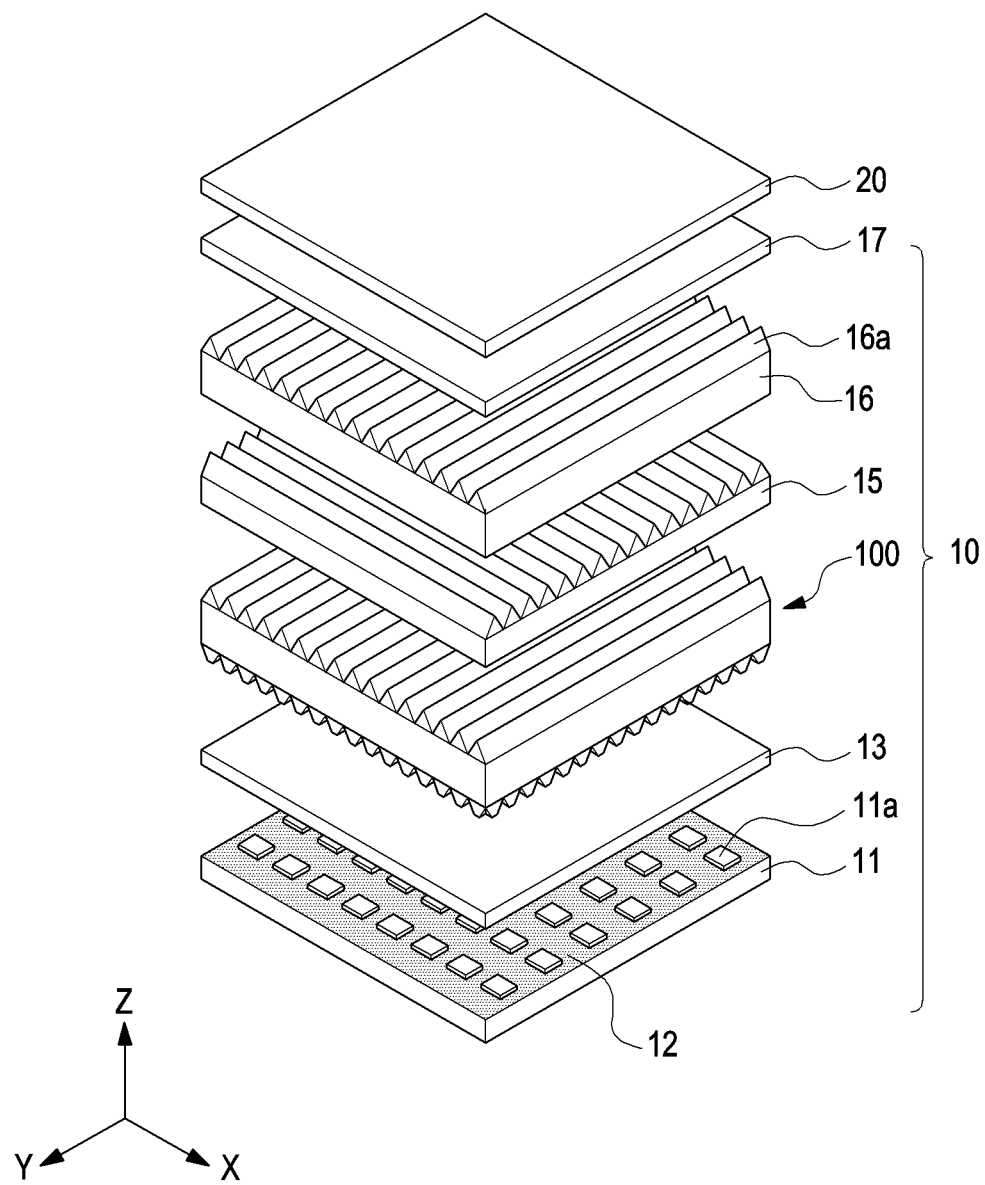
FIG. 3 is a perspective view illustrating a Liquid Crystal Display module including a backlight unit according to various embodiments in the present invention.

FIG. 3 is a perspective view illustrating a Liquid Crystal Display module including a backlight unit according to various embodiments in the present invention.

In FIGS. 2 and 3, a LCD module 1 according to an embodiment of the present invention includes a backlight unit 10 and a liquid crystal panel 20. The backlight unit 10 includes a substrate 11 including a light source 11a, a color conversion sheet 13, an optical film 100, prism sheets 15 and 16, and a diffusion sheet 17. According to an embodiment, the reflective sheet 12 may be formed on one surface of the substrate 11.

According to an embodiment, at least one of these components (e.g., the diffusion sheet 17) can be omitted, or one or more other components (e.g., a reflective polarizing sheet (not shown)) can be added in the backlight unit 10. Below, descriptions of portions overlapping those of FIG. 1 will be omitted. The LCD module 1 of the present invention may be characterized in that it does not include the lower diffusion sheet 14 of FIG. 1, but it provides the optical film 100 of the present invention.

In the present disclosure, the term 'optical film' may refer to a film including a first pattern layer and further including a light diffusion layer and a second pattern layer in the light-transmitting base film. In the drawing of FIG. 2, although it is exaggerated a little for convenience of explanation, the optical film 100 is formed to have a thinner thickness (e.g., the thickness of the light diffusion layer 122 μm) over a lower diffusion sheet in FIG. 1 formed with a predetermined thickness (e.g., 300 μm) to shield the shape of the light source 11a. The optical film 100 includes a plurality of pattern layers of the first pattern layer and the second pattern layer, and may be formed to be thinner than the thickness of a conventional diffusion sheet even though it further includes a light diffusion layer. As a result, the LCD module of FIG. 2 may be thinner than the LCD module 1 of FIG. 1 having a thick lower diffusion sheet 14.

Figure 4:
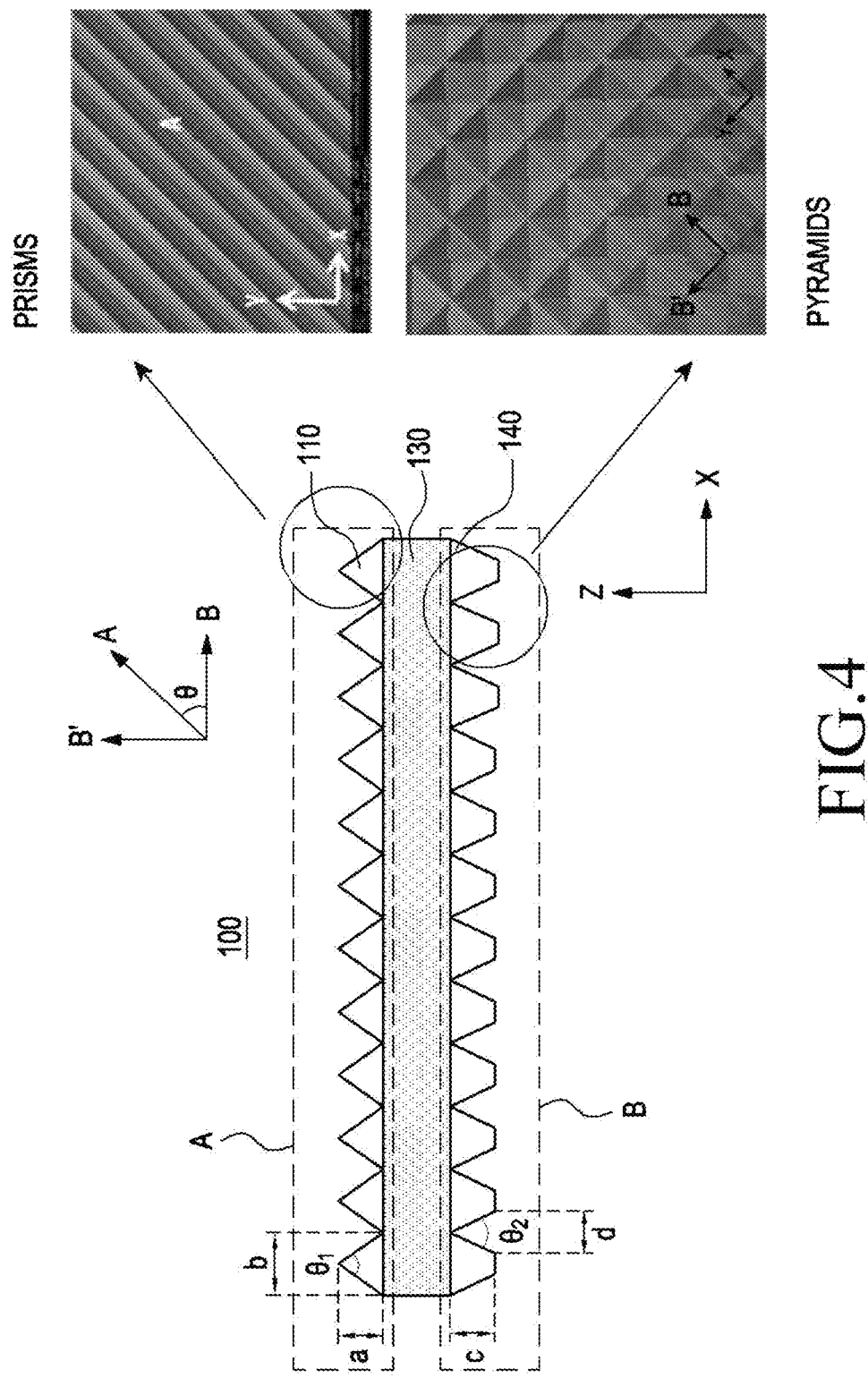
FIG. 4 is a cross-sectional view illustrating a portion of an optical film according to various embodiments in the present invention.

FIG. 4 is a cross-sectional view illustrating a portion of an optical film according to various embodiments in the present invention.

An optical film 100 according to an embodiment of the present disclosure includes a first pattern layer 110, a base film 130, and a second pattern layer 140.

According to various embodiments, the base film 130 supports the optical film 100 as a whole, and may be positioned between the first pattern layer 110 and the second pattern layer 140. For example, the first pattern layer 110 may be disposed on one surface of the base film 130 facing the +Z axis direction. As another example, the second pattern layer 140 may be disposed on one surface of the base film 130 facing the −Z axis direction.

According to various embodiments, the first pattern layer 110 may include a plurality of prisms having a pattern direction parallel to the first direction (e.g., A direction). Each of the plurality of prisms has a triangular cross-section. Each of the plurality of prism patterns is designed to have a size gradually decreasing toward the +Z axis.

According to various embodiments, the second pattern layer 140 includes a plurality of pyramids having a plurality of rows in a second direction (e.g., B direction) and a plurality of columns in a third direction (e.g., B' direction) perpendicular to the second direction. A cross-section of each of the plurality of pyramids has a triangular or trapezoidal shape. The plurality of pyramids may be designed as intaglio patterns when viewed from under the second pattern layer 140 (viewed along the +Z axis). According to an embodiment, the second direction (e.g., B direction) may face a different direction from the first direction (e.g., A direction). According to another exemplary embodiment, the angle θ formed between the second direction (e.g., B direction) and the first direction (e.g., A direction) may be formed to be an acute angle. By making the second direction (e.g., direction B) form an acute angle with the first direction (e.g., direction A), it is possible to prevent a moire effect from occurring. Each of the plurality of pyramids may be designed to have a size gradually increasing toward the −Z axis.

[Table 1] shows the degree of moire effect, brightness, and shielding effect with respect to the arrangement of the plurality of prisms of the first pattern layer 110 (e.g., the first direction) and the arrangement of the plurality of pyramids of the second pattern layer 140 (e.g., the second direction).

TABLE 1

| | Angle θ between the Prism and the Pyramid | | | | |
|---|---|---|---|---|---|
| Angle (θ) | 0° | 15° | 30° | 45° | 90° |
| Moire Effect | Yes | No | No | No | Yes |
| Brightness (%) | 130.8 | 125.8 | 127.2 | 126.7 | — |
| Shielding Effect (HSV) | 3.1 | 2.7 | 2.7 | 2.7 | |

In [Table 1], it can be recognized that when the angle θ between the prism and the pyramid is an acute angle, for example, no moire effect is occurred at about 15°, about 30°, and about 45°.

In [Table 1], it can also be recognized that when the angle θ between the prism and the pyramid is an acute angle, the brightness is measured to be about 125% to 127%, and the Hot Spot Visibility (HSV) is improved despite there is a slight decrease in brightness compared to the angle of 0°. For example, when the angle θ between the prism and the pyramid is an acute angle, it can be confirmed that the Hot Spot Visibility (HSV) caused by the concentration of light is reduced from about 3.1 to about 2.7 compared to the angle of 0°.

According to one embodiment, the base film 130 is configured to support the first pattern layer 110 and/or the second pattern layer 140. For example, the base film 130 is made of a transparent material that can transmit light, such as polycarbonate, polysulfone, polyacrylate, polystyrene, polyvinyl chloride, polyvinyl alcohol, polynorbornene, and polyester. As a specific example, the base film 130 may be made of at least one of polyethylene terephthalate and polyethylene naphthalate.

According to an embodiment, the thickness of the base film 130 may be, for example, about 10 to 200 μm, and more specifically, about 30 to 100 μm. However, the thickness of the base film 130 is not limited to the above example, and the design may be variously changed to a thickness suitable to support the first pattern layer 110 and the second pattern layer 140.

The optical film 100 according to the present disclosure is provided with a pattern layer (the first pattern layer 110 and the second pattern layer 140) on one side and the other side, that is, on both sides of the base film 130, respectively, thus, it is possible to increase the light diffusion effect and simultaneously to reduce the optical interference phenomenon and the color non-uniformity phenomenon. According to one embodiment, micro-patterning for the first pattern layer 110 and the second pattern layer 140 can be implemented by depositing Ultra Violet (UV) curable resin solution on one surface (or the other surface) of the base film 130, and curing the resin by irradiating with UV light. The thickness of the first pattern layer 110 may be about 10 to 50 μm, and more specifically, about 30 to 40 μm.

According to various embodiments, in relation to the light diffusion effect, light incident on the second pattern layer 140 may be diffused through a plurality of pyramids formed on the second pattern layer 140. The second pattern layer 140 may transmit light in the light emitting direction (Z direction) of the light source 11a. In this process, loss of light caused by the light refraction and reflection on the interface of the pyramids, etc., may be minimized, and a decrease in brightness may also be minimized. The pyramids formed on the second pattern layer 140 may include a plurality of (e.g., M×N) pyramids, and include M rows and at least partially overlapping with the light sources 11*a* formed on the substrate 11. Pyramids having N columns may be formed. The thickness of the second pattern layer 140 may be about 5 to 30 μm, and more specifically, about 10 to 20 μm.

According to the embodiments shown in FIGS. 2 to 4 of the present disclosure, the optical film 100 including the first pattern layer 110, the base film 130, and the second pattern layer 140 has a thinner thickness compared to the lower diffusion sheet 14 according to the embodiment shown in FIG. 1. The optical film 100 has a high diffusion efficiency by allowing light through the first pattern layer 110 and the second pattern layer 140 thereby it may have an effect of preventing the shape of the light source 11*a* from being visually recognized from the outside (Shielding Effect).

According to various embodiments of the present disclosure with respect to the light diffusion effect, the boundary between each layer of the first pattern layer 110, the base film 130, and the second pattern layer 140 may be formed to have a refractive index difference. According to one embodiment, the first pattern layer 110 and the base film 130 have a low refractive index, and the second pattern layer 140 has a high refractive index relatively compared to the first pattern layer 110 and the base film 130.

According to various embodiments, the optical film 100 has a first pattern layer 110 where a prism of a predetermined height a and a pitch b is formed, and a second pattern layer 140 where a pyramid of a predetermined height c and a pitch d is formed.

According to an embodiment, in the first pattern layer 110, the height a and the pitch b of the prism may be defined as a first apex angle $\theta_1$. Here, the first apex angle $\theta_1$ may be defined as an angle between two opposing surfaces among three surfaces forming a prism having a triangular cross-section. For example, the first apex angle $\theta_1$ may be defined within a range of 70° to 150°. In addition, the height a and the pitch b of the prism having a triangular cross-section may be defined according to a ratio based on the first apex angle $\theta_1$. For example, when the first apex angle $\theta_1$ is 90°, the ratio of the height a to the pitch b of the prism may be defined as 1:2. For example, the height a of the prism pattern may be about 12 to 50 μm, and the pitch b of the prism pattern may be about 24 to 100 μm.

According to another embodiment, in the second pattern layer 140, the height c and the pitch d of the pyramid may be defined as a second apex angle $\theta_2$. Here, the second apex angle $\theta_2$ may be defined as an angle between two opposing faces among four faces forming a pyramid having a trapezoidal cross-section. For example, the second apex angle $\theta_2$ may be defined within a range of 70° to 150°. As the second apex angle 02 of the pyramid increases within a specified range, the diffusivity of light incident on the optical film 100 may be further reduced. In addition, the height c and the pitch d of the pyramid having a trapezoidal cross-section may be defined according to a ratio based on the second apex angle $\theta_2$. For example, when the second apex angle $\theta_2$ is 130°, the ratio of the height c to the pitch d of the pyramid may be defined as 1:4.3. For example, the height c of the pyramid pattern may be about 1 to 90 μm, and the pitch d of the pyramid pattern may be about 4 to 400 μm. A plurality of pyramid patterns having such a height c and a pitch d may be regularly arranged in the bottom portion of the optical film 100. The plurality of pyramids corresponds to a light source (e.g., the light source 11*a* of FIG. 3) formed on a substrate (e.g., the substrate 11 of FIG. 3) by 1:1 or are arranged where they at least partially overlap with the light source. Consequently, a point light source emitted from the light source is diffused as a surface light source while light from the light source 11*a* is separated (or diffused) by the diffusion of the optical film 100. Therefore, Hot Spot Visibility (HSV) due to the concentration of light can be reduced.

Figure 5:
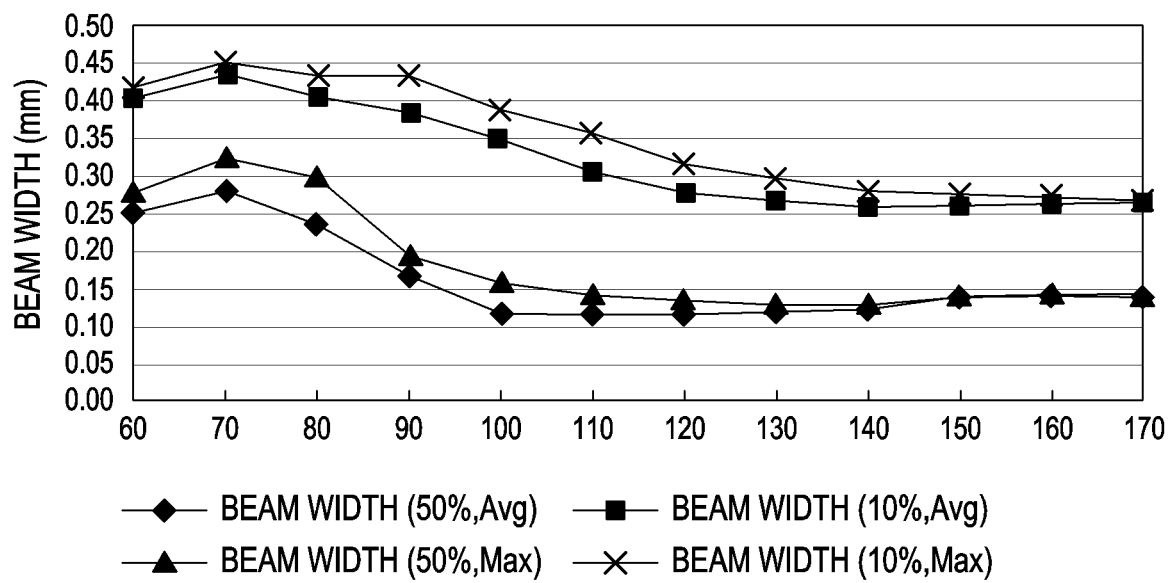
FIG. 5 is a graph illustrating a trend of a beam width with respect to each apex angle of a prism of a first pattern layer for various embodiments in the present invention.

FIG. 5 is a graph illustrating a trend of a beam width with respect to each apex angle of a prism of a first pattern layer for various embodiments in the present invention.

Figure 6:
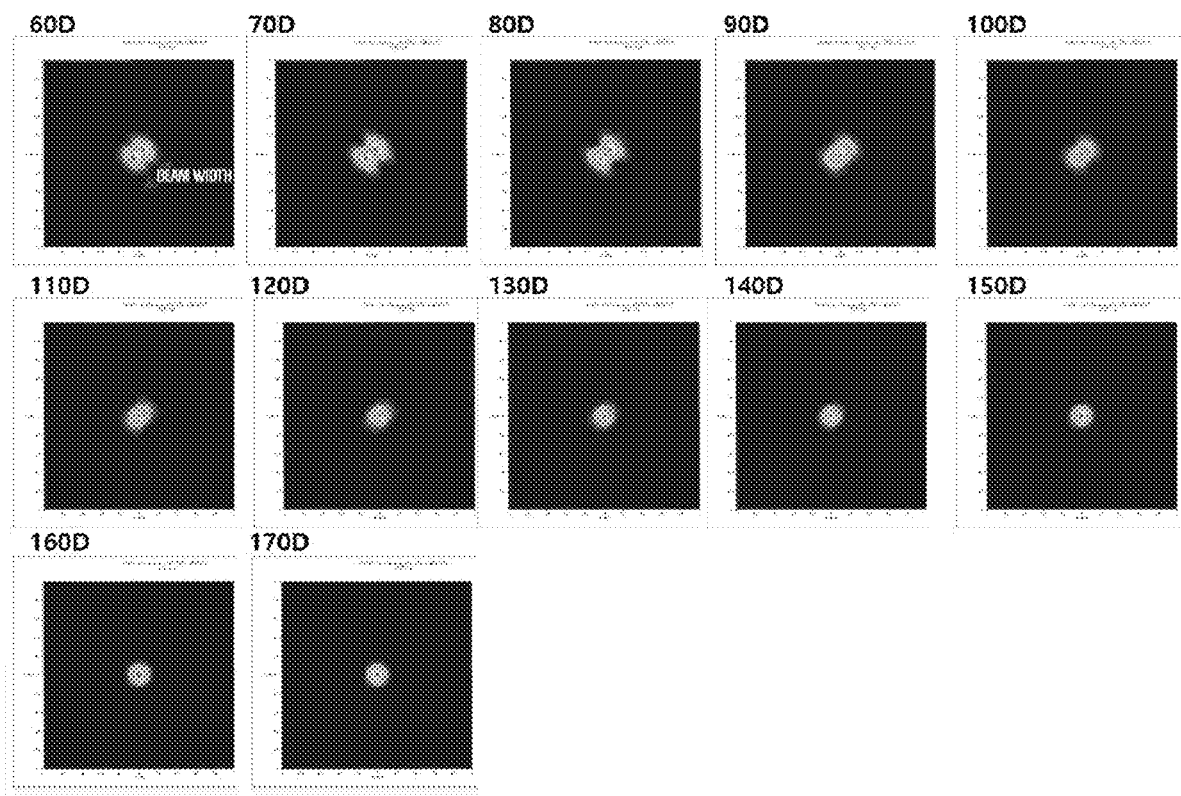
FIG. 6 is a diagram showing a light distribution corresponding to an apex angle of a prism of a first pattern layer for various embodiments in the present invention.

FIG. 6 is a diagram showing a light distribution corresponding to an apex angle of a prism of a first pattern layer for various embodiments in the present invention.

In FIG. 5, the degree of a beam width can be confirmed by fixing a second apex angle $\theta_2$ of a pyramid (e.g., FIG. 4) of the second pattern layer 140 while varying a first apex angle $\theta_1$ of a prism (e.g., FIG. 4) of the first pattern layer 110. In the graph of FIG. 5, the beam width may mean the width of a designated point compared to the brightness of the center of the prism. For example, a 50% beam width may mean a width of a point having a brightness of 50% compared to the center of the prism. A 10% beam width may mean a width of a point having a brightness of 10% compared to the center of the prism. As another example, the average beam width (Avg) may mean an average value of the beam widths in all directions of the prism. The maximum beam width (Max) may mean a value of the beam width in the widest direction of the prism.

According to various embodiments, the beam width was measured when the second apex angle $\theta_2$ of the pyramid of the second pattern layer 140 is fixed to be about 130° while the first apex angle $\theta_1$ of the prism of the first pattern layer 110 is varied from about 60° to 170°. According to the present disclosure, as the first apex angle $\theta_1$ of the prism of the first pattern layer 110 increases, the area of the beam width decreases thereby it can be seen that the light diffusion area decreases.

According to an embodiment, it can be seen that the beam width in the first pattern layer 110 has a maximum value when the first apex angle $\theta_1$ of the prism is about 70°. For example, when the first apex angle $\theta_1$ of the prism is about 70°, the beam width (50%, Avg) of the prism represents a value of about 0.28 mm and the beam width (50%, Max) of the prism represents a value of about 0.32 mm. As another example, when the first apex angle $\theta_1$ of the prism is about 70°, the beam width (10%, Avg) represents a value of about 0.43 mm and the beam width (10%, Max) represents a value of about 0.45 mm. In the first pattern layer 110, it can be recognized that the beam width represents the minimum value when the first apex angle $\theta_1$ of the prism is about 140°. For example, when the first apex angle $\theta_1$ of the prism is about 140°, the beam width (50%, Avg) represents a value of about 0.12 to 0.13 mm, and the beam width (50%, Max) represents about 0.12 to 0.13 mm. As another example, when the first apex angle Oi of the prism is about 140°, the beam width (10%, Avg) represents a value of about 0.26 mm and the beam width (10%, Max) represents a value of about 0.27 to 0.28 mm.

Referring to FIG. 6, as the first apex angle $\theta_1$ of the prism of the first pattern layer 110 increases, the area of the beam width decreases, thus, it can be seen that the light diffusion area decreases. For example, in the light distribution diagram of FIG. 6, it can be confirmed when the first apex angle $\theta_1$ of the prism of the first pattern layer 110 sequentially increases from 60° to 170° by 10°, the beam width gradually decreases.

According to various embodiments, the prism of the first pattern layer 110 may be formed in an engraved pattern to overcome disadvantages of the embossed pattern. For example, if the prism is designed as an embossed pattern, a tendency to increase the beam width is confirmed as the first apex angle θ1 of the prism increases, and consequently, disadvantages such as occurrence of scratches and forming bubbles in the apex portion may be recognized.

Figure 7:
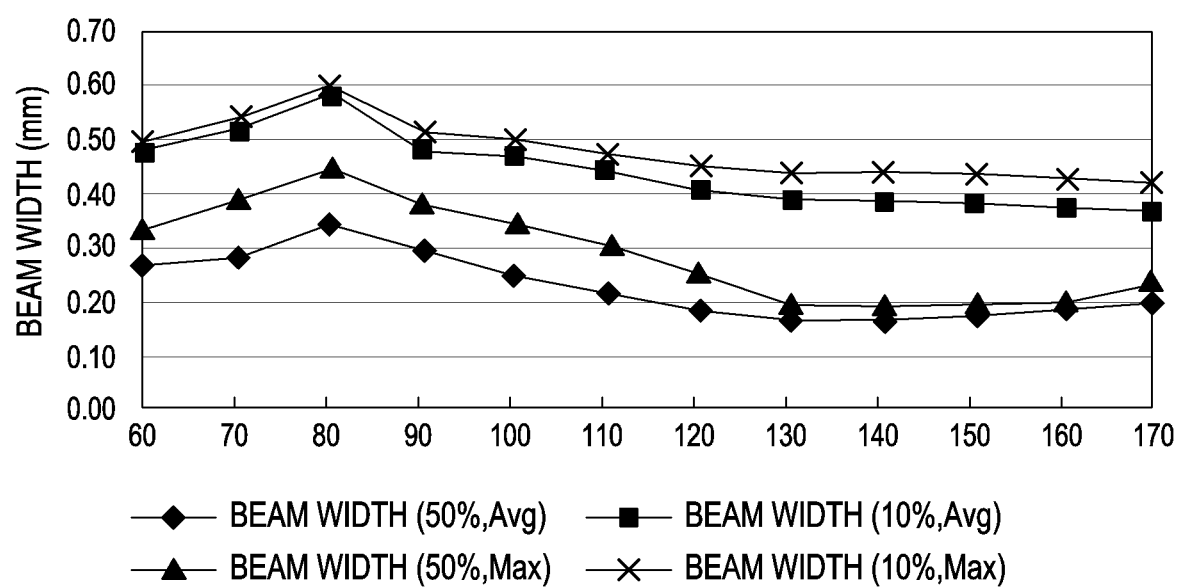
FIG. 7 is a graph illustrating a trend of a beam width for each apex angle of a pyramid of a second pattern layer for various embodiments in the present invention.

FIG. 7 is a graph illustrating a trend of a beam width for each apex angle of a pyramid of a second pattern layer for various embodiments in the present invention.

Figure 8:
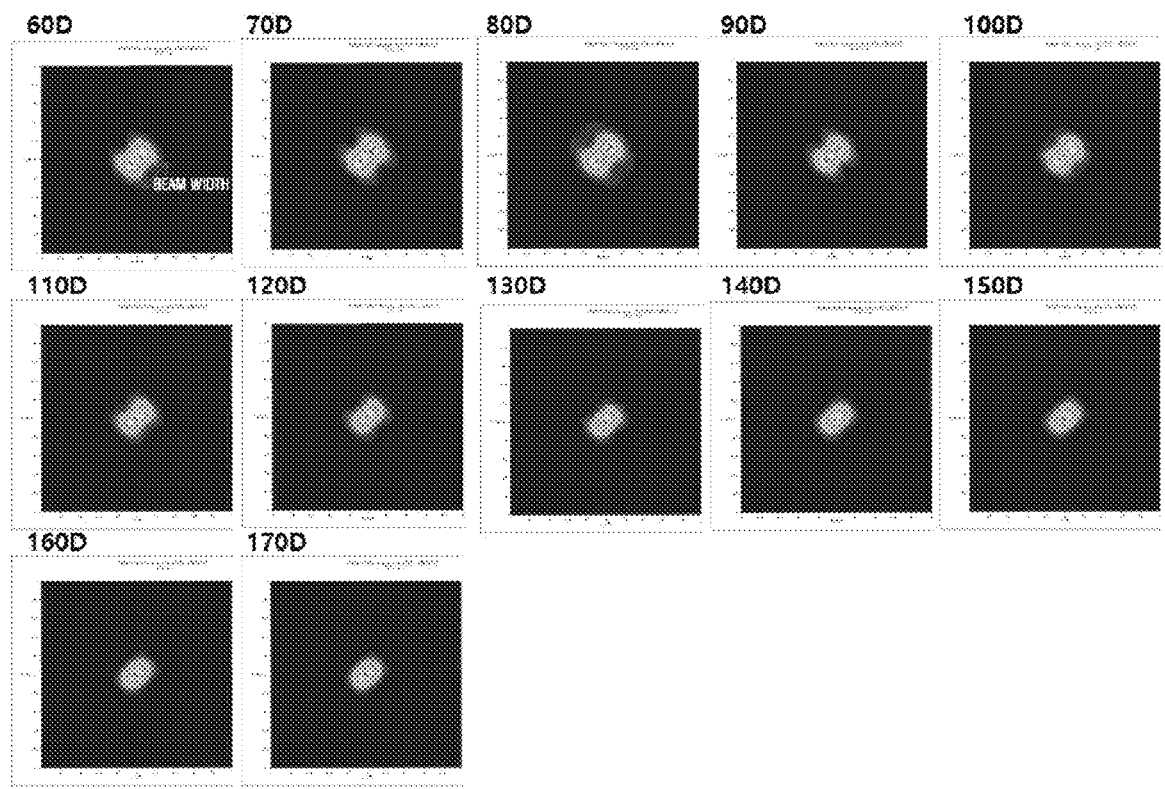
FIG. 8 is a diagram showing a light distribution corresponding to an apex angle of a pyramid of a second pattern layer for various embodiments in the present invention.

FIG. 8 is a diagram showing a light distribution corresponding to an apex angle of a pyramid of a second pattern layer for various embodiments in the present invention.

Referring to FIG. 7, when the first apex angle $\theta_1$ of the prism (e.g., FIG. 4) of the first pattern layer 110 is fixed while the second apex angle $\theta_2$ of the pyramid of the second pattern layer 140 (e.g., in FIG. 4) is varied, the degree of the beam width can be confirmed. In the graph of FIG. 7, the beam width may mean a width of a designated point compared to the brightness of the center of the pyramid. For example, a 50% beam width may mean a width of a point having a brightness of 50% compared to the center of the pyramid. A 10% beam width may mean a width of a point having a brightness of 10% compared to the center of the pyramid. As another example, the average beam width (Avg) may mean an average value of the beam widths in all directions of the pyramid. The maximum beam width (Max) may mean a value of the beam width in the widest direction of the pyramid.

According to various embodiments, the beam width was measured when the first apex angle $\theta_1$ of the prism of the first pattern layer 110 is fixed to about 90° while the second apex angle $\theta_2$ of the pyramid of the second pattern layer 140 is varied from about 60° to 170°. According to the present disclosure, as the second apex angle $\theta_2$ of the pyramid of the second pattern layer 140 increases, the area of the beam width decreases, and thus, it can be seen that the light diffusion area decreases.

According to an embodiment, it can be seen that the beam width has a maximum value when the second apex angle $\theta_2$ of the pyramid is about 80° in the second pattern layer 140. For example, when the second apex angle $\theta_2$ of the pyramid is about 80°, the beam width (50%, Avg) represents a value of about 0.32 mm and the beam width (50%, Max) represents a value of about 0.42 mm. As another example, when the second apex angle $\theta_2$ of the pyramid is about 80°, the beam width (10%, Avg) represents a value of about 0.58 mm and the beam width (10%, Max) represents a value of about 0.59 mm. It can be seen that the beam width represents the minimum value when the second apex angle $\theta_2$ of the pyramid is about 130° in the second pattern layer 140. For example, when the second apex angle $\theta_2$ of the pyramid is about 130°, the beam width (50%, Avg) represents a value of about 0.18 mm and the beam width (50%, Max) represents a value of about 0.20 mm. As another example, when the second apex angle $\theta_2$ of the pyramid is about 130°, the beam width (10%, Avg) represents a value of about 0.39 mm and the beam width (10%, Max) represents a value of about 0.42 mm.

Referring to FIG. 8, as the second apex angle $\theta_2$ of the pyramid of the second pattern layer 140 increases, the beam width decreases, thus, it can be seen that the light diffusion region decreases. For example, in the light distribution diagram of FIG. 8, as the second apex angle $\theta_2$ of the pyramid of the second pattern layer 140 sequentially increases from 60° to 170° by 10°, it can be confirmed that the beam width gradually decreases.

According to various embodiments, the pyramid of the second pattern layer 140 may be formed as an engraved pattern to overcome disadvantages of the embossed pattern. For example, if the pyramid is designed as an embossed pattern, a tendency to increase the beam width is confirmed as the first apex angle $\theta_2$ of the pyramid increases, and consequently, disadvantages such as occurrence of scratches and forming bubbles in the apex portion may be recognized.

Figure 9:
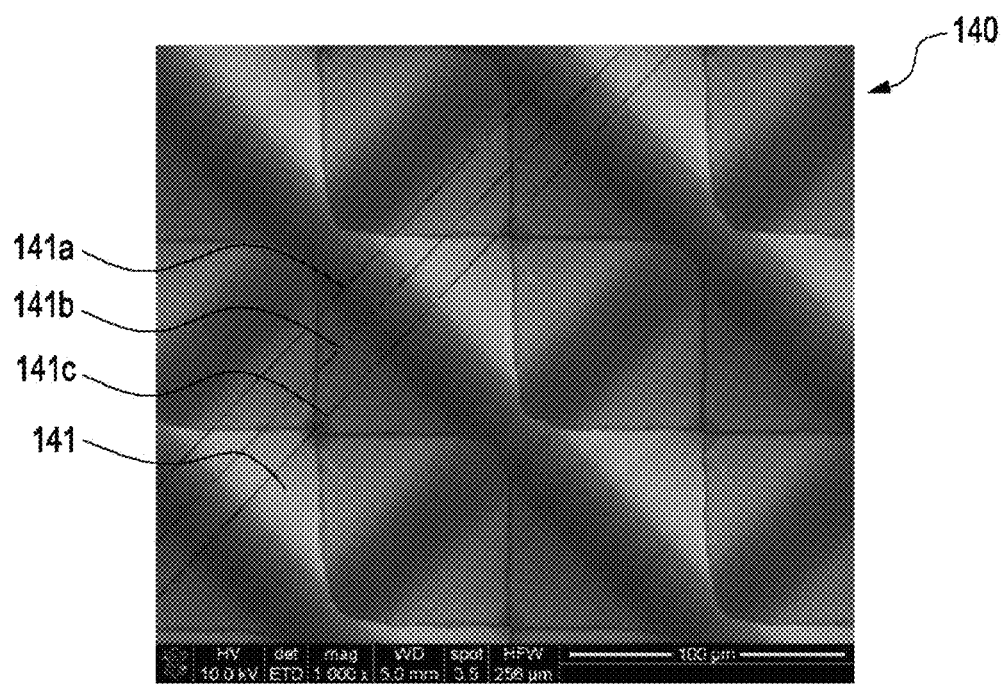
FIG. 9, FIGS. 10A and 10B are pictures of a portion of optical films viewed from above according to various embodiments in the present invention.
Figure 10A:
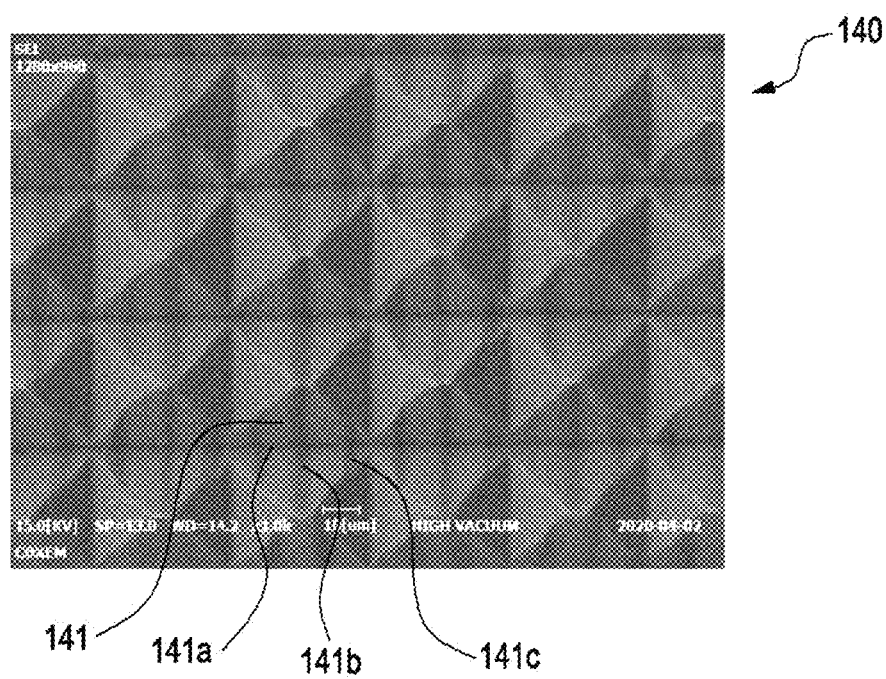
Figure 10B:
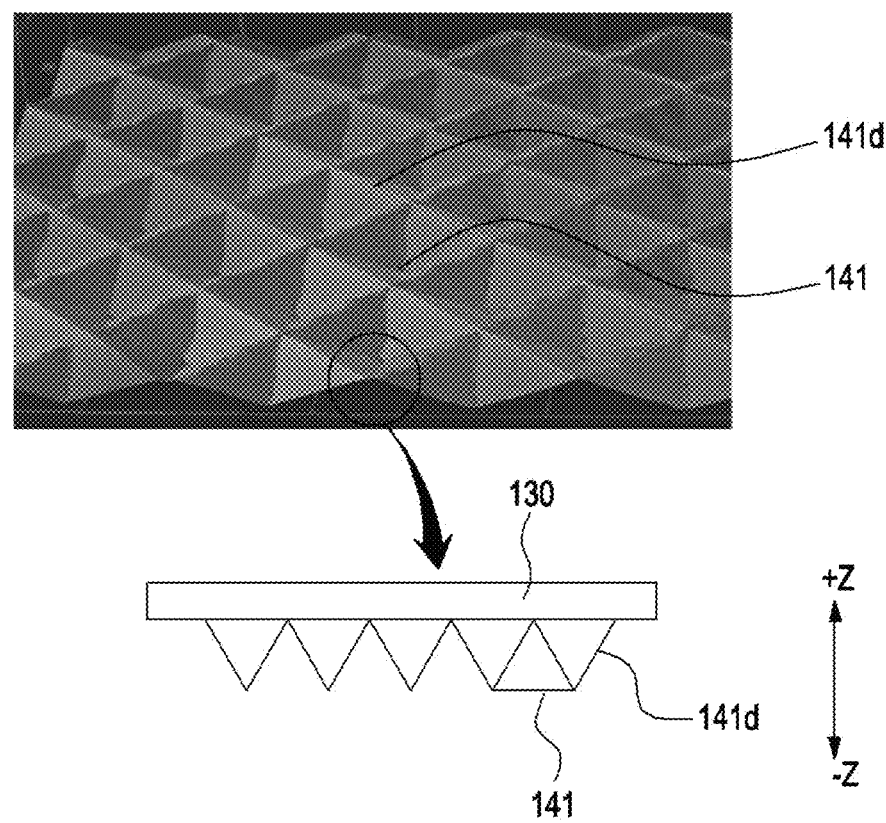

FIG. 9, FIGS. 10A and 10B are pictures of a portion of optical films viewed from above according to various embodiments in the present invention.

FIGS. 11A to 11D are a cross-sectional view of FIG. 9 according to various embodiments in the present invention.

An optical film according to an embodiment of the present disclosure (e.g., the optical film 100 of FIGS. 2 and 3) comprises a first pattern layer (e.g., the first pattern layer 110 of FIG. 4), a base film (e.g., the base film 130 of FIG. 4) and a second pattern layer (e.g., the second pattern layer 140 of FIG. 4).

According to various embodiments, when the second pattern layer 140 of the optical film 100 is viewed from above or below, separate line patterns (141a, 141b, 141c) may be formed. For example, when the pyramids 141 are processed on the second pattern layer 140, the line patterns 141a, 141b and 141c may be generated along the pyramid surface of each of the pyramids 141 due to a chaos frequency.

According to various embodiments, each of the line patterns 141a, 141b, and 141c may be arranged in parallel with an interval of about 10 μm or less. According to another embodiment, about 10 or less line patterns 141a, 141b and 141c may be arranged side by side in one pyramid-shaped pyramid 141. As the line patterns 141a, 141b and 141c can be formed in different patterns other than the pyramids (e.g., the pyramid 141) forming the second pattern layer 140, it is possible to provide an effect of spreading light from left to right. As light spreads from left to right in the second pattern layer 140, a viewing angle may be improved and the screen distortion may be prevented.

According to various embodiments, the pyramids 141 of the second pattern layer 140 may be an intaglio pyramid shape. For example, when the second pattern layer 140 is viewed from below (−Z-axis direction) with respect to the base film 130, it may have an inwardly recessed shape. A cross-section of each of the pyramids 141 may be a triangle. According to an embodiment, a barrier rib 141d may be disposed between the pyramids 141. The end of the barrier rib 141d may be designed to have a sharp corner shape or to be designed to have a flat portion. For example, the cross-section of the barrier rib 141d may have a triangular shape. As another example, the cross-section of the barrier rib 141d may have a trapezoidal shape. One surface of the pyramid 141 may be a side surface of the barrier rib 141d and a flat portion may be an upper surface of the barrier rib 141d.

FIGS. 11A to 11D, various pyramids of the second pattern layer 140 are disclosed. According to various embodiments, when the second pattern layer 140 is viewed from a side cross-section, each of the pyramids may be connected to each other and arranged in parallel (e.g., arranged in rows and columns).

Figure 11A:
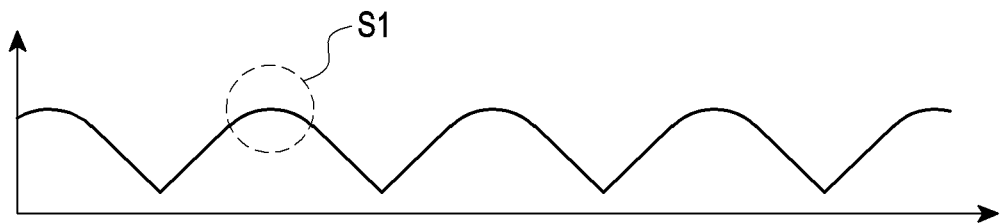
FIGS. 11A to 11D are a cross-sectional view of FIG. 9 according to various embodiments in the present invention.

Referring to FIG. 11A, a region adjacent to an end of each of the pyramids may include a planar section S (e.g., a flat portion of the barrier rib 141d of FIG. 10B). The planar section S may be designed to prevent a sheet from breaking and may be provided in a size of about 30% or less with respect to the pitch of the pyramid. For example, the planar section S may be about 28 μm.

Figure 11B:
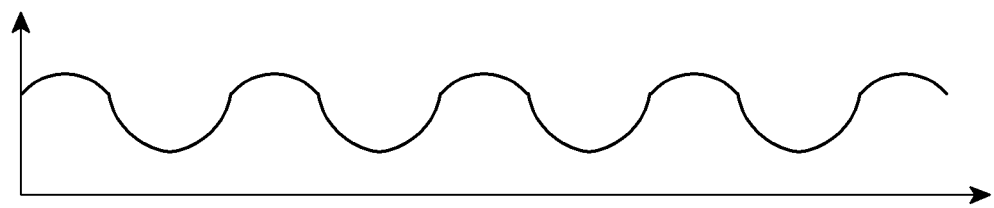
Figure 11C:
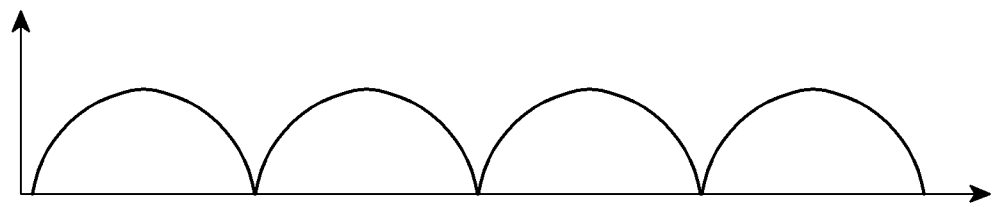
Figure 11D:
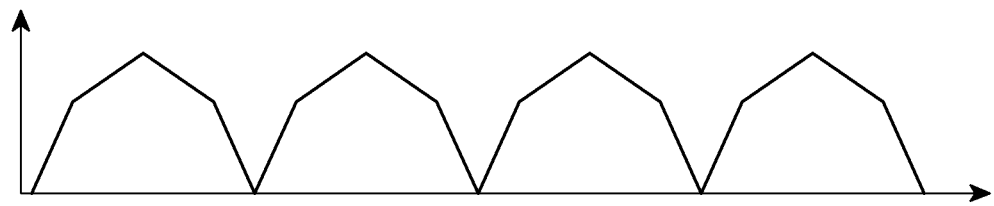

FIGS. 11B, 11C, and 11D, each of the pyramids may be designed and changed in various structures such as a curved shape or a double-angled shape in addition to a general linear shape to maximize shielding. In FIGS. 11B and 11C, at least a portion of each of the pyramids may form a curved surface. In FIG. 11D, each of the pyramids may be provided in a pentagonal shape when it is viewed in cross-section.

Figure 12:
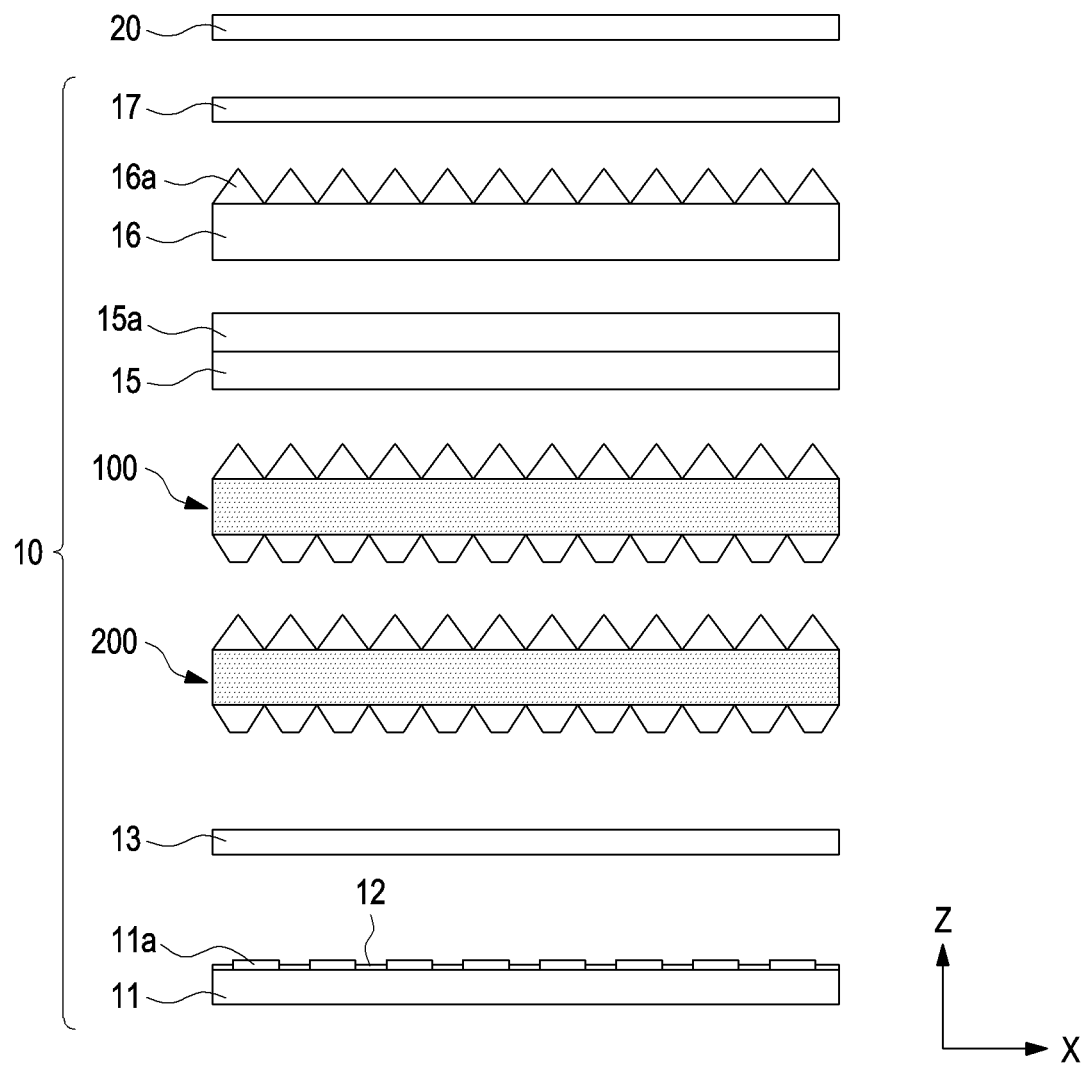
FIG. 12 is an overview showing a Liquid Crystal Display module adapting two optical films according to another embodiment of the present invention.

FIG. 12 is an overview showing a Liquid Crystal Display module adapting two optical films according to another embodiment of the present invention.

Figure 13:
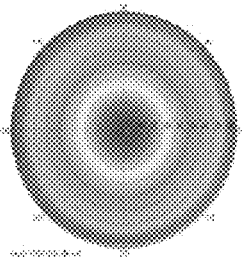
FIG. 13 is a table showing optical characteristics and diagrams comparing between the embodiment adapting one optical film in FIG. 1 and another embodiment adapting two optical films in FIG. 12.
Figure 13:
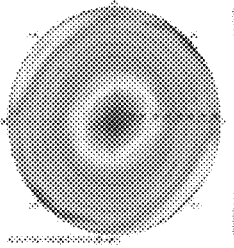
Figure 13:
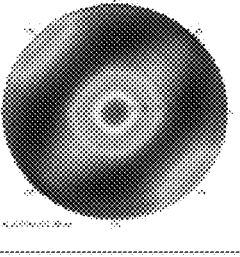
Figure 13:
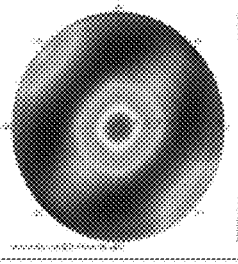

FIG. 13 is a table showing optical characteristics and diagrams comparing between the embodiment adapting one optical film in FIG. 1 and another embodiment adapting two optical films in FIG. 12.

In FIG. 12, a LCD module 1 may include a plurality of optical films 100 and 200. The LCD module 1 may be designed to include three or more optical films being stacked in addition to a structure as shown in FIG. 12 where the first optical film 100 and the second optical film 200 are disclosed.

In FIG. 12, the LCD module 1 according to an embodiment of the present disclosure includes a backlight unit 10 and a liquid crystal panel 20, and the backlight unit 10 includes a substrate 11, a color conversion sheet 13, optical films 100 and 200, prism sheets 15 and 16, and a diffusion sheet 17. According to an embodiment, a reflective sheet 12 may be formed on the substrate 11. The LCD module 1 of the present invention may comprise at least two optical films 100 and 200 without a lower diffusion sheet 14 of FIG. 1. Below, descriptions of components overlapping with FIGS. 1 to 4 will be omitted.

FIG. 13 (a) shows the viewing angle distribution and brightness measurement results with respect to the diffusion sheet 14 disclosed in the embodiment of FIG. 1 and FIG. 13 (b) represents the viewing angle distribution and brightness measurement results with respect to the optical films 100 and 200 disclosed in the embodiment of FIG. 12.

As a result of measuring the viewing angle and brightness for each of the embodiments of FIG. 1 and FIG. 12, it can be recognized that the viewing angles of the optical films 100 and 200 according to the embodiment of FIG. 12 are increased. In the case of FIG. 12, the brightness is measured to be about 120% and there is a slight decrease in brightness compared to the embodiment of FIG. 1. However, it can be seen that the viewing angle and Hot Spot Visibility (HSV) are improved. In the case of FIG. 12, the combined thickness of the two optical films 100 and 200 is formed to be about 240 μm, and thus may have a thinner thickness than the thickness of the diffusion sheet 14 of 300 μm in FIG. 1. In addition, there is significant impact on the viewing angle distribution and Hot Spot visibility (HSV). For example, compared to the embodiment of FIG. 1, it can be confirmed that the Hot Spot Visibility (HSV) caused by the concentration of light in the embodiment of FIG. 12 is reduced from about 4.8 to about 4.4.

According to various embodiments of the present disclosure, the thickness of the backlight unit may be reduced by not including the diffusion sheet having a thick thickness. In addition, it is possible to provide an optical film having excellent shielding performance as to a mini-LED or a micro-LED and a backlight unit including the same.

The illustrated and above-describe embodiments are not intended to be limiting in any way, and any such modifications to the embodiments described are intended to be included within the spirit and scope of the present invention and protected by the claims that follow.

The invention claimed is:

1. A backlight unit comprising:
   a light source;
   a color conversion sheet disposed above the light source for converting a color of light emitted from the light source; and
   an optical film disposed over the color conversion sheet, the optical film comprising:
   a base film;
   a first pattern layer including a first pattern of a plurality of prisms formed on a first surface of the base film and arranged parallelly in a first direction; and
   a second pattern layer including a second pattern of a plurality of pyramids including a plurality of rows in a second direction and a plurality of columns in a third direction perpendicular to the second direction and formed on a second surface of the base film,
   wherein the second direction is misaligned to the first direction to form an angle in a range of greater than 0° to 45° or less.

2. The backlight unit according to claim 1, wherein the pyramids have a size gradually increasing in a P1 direction toward to the color conversion sheet, and the prisms have a size gradually decreasing in a P2 direction opposite to the direction P1 to the color conversion sheet.

3. The backlight unit according to claim 1, further comprising:
   a first prism sheet disposed on the optical film; and
   a second prism sheet disposed on the optical film,
   wherein the first prism sheet and the second prism sheet having a plurality of prisms are stacked together and a pattern of the first prism and the second prism are arranged in a different direction each other.

4. The backlight unit according to claim 3, wherein the first prism sheet and the second prism sheet are laminated.

5. The backlight unit according to claim 3, further comprising: a second optical film disposed on the first optical film, wherein the second optical film comprises:
   a second base film;
   a third pattern layer having a plurality of prisms on one surface of the second base film; and
   a fourth pattern layer disposed on the other surface of the second base film and having a fourth pattern different from the third pattern,
   wherein the fourth pattern layer comprises a plurality of pyramids.

6. The backlight unit according to claim 1, wherein:
   a cross-section of the prism of the first pattern layer is a first triangular shape, and a cross-section of the pyramid of the second pattern layer is a second triangular shape,
   the prism of the first pattern layer forms a first apex angle defined as an angle between two opposing sides among three sides of the first triangular shape,
   the first apex angle is in a range of 70° to 150°,
   the pyramid of the second pattern layer forms a second apex angle defined as an angle between two opposing sides of the four sides of the pyramid shape, and
   the second apex angle is in a range of 70° to 150°.

7. The backlight unit according to claim 1, wherein:
   the second pattern layer includes a plurality of line patterns formed in parallel with respect to one pyramid surface of the pyramid;

each of the plurality of line patterns is in an interval of 10 gm or less; and the plurality of line patterns is formed in a pattern where 10 or less lines are arranged side by side on the one pyramid surface.

8. The backlight unit according to claim 1, wherein the second pattern layer further includes a barrier rib formed between the pyramids, and wherein the barrier rib has a planar section having a size of 30% or less with respect to a pitch of the pyramids.

9. An optical film comprising:
a base film;
a first pattern layer including a first pattern of a plurality of prisms formed on a first surface of the base film and arranged parallelly in a first direction; and
a second pattern layer including a second pattern of a plurality of pyramids including a plurality of rows in a second direction and a plurality of columns in a third direction perpendicular to the second direction and formed on a second surface of the base film,
wherein the second direction is misaligned to the first direction to form an angle in a range of greater than 0° to 45° or less.

10. The optical film according to claim 9, wherein the second pattern of the plurality of the pyramids are formed to be intaglio.

11. The optical film according to claim 10, wherein the second pattern layer further includes a barrier rib formed between the pyramids, and wherein the barrier rib has a planar section having a size of 30% or less with respect to a pitch of the pyramids.

12. The optical film according to claim 9, wherein a cross-section of the prism of the first pattern layer is a first triangular shape, and wherein a cross-section of the pyramid of the second pattern layer is a second triangular shape.

13. The optical film according to claim 12, wherein the prism of the first pattern layer forms a first apex angle defined as an angle between two opposing sides among three sides of the first triangular shape, and wherein the first apex angle is in a range of 70° to 150°.

14. The optical film according to claim 12, wherein one or more of the pyramids of the second pattern layer form a second apex angle defined as an angle between two opposing sides of the four sides of the pyramid shape, and wherein the second apex angle is in a range of 70° to 150°.

15. The optical film according to claim 9, wherein the second pattern layer includes a plurality of line patterns formed in parallel with respect to one pyramid surface of one of the plurality of the pyramids.

16. The optical film according to claim 15, wherein each of the plurality of line patterns is in an interval of 10 μm or less.

17. The optical film according to claim 15, wherein the plurality of line patterns is formed in a pattern, and wherein 10 or less lines are arranged side by side on the one pyramid surface.

* * * * *